Aug. 18, 1931.  A. M. LOFLAND  1,819,297
DEMOUNTABLE FELLY
Filed May 1, 1926  2 Sheets-Sheet 1
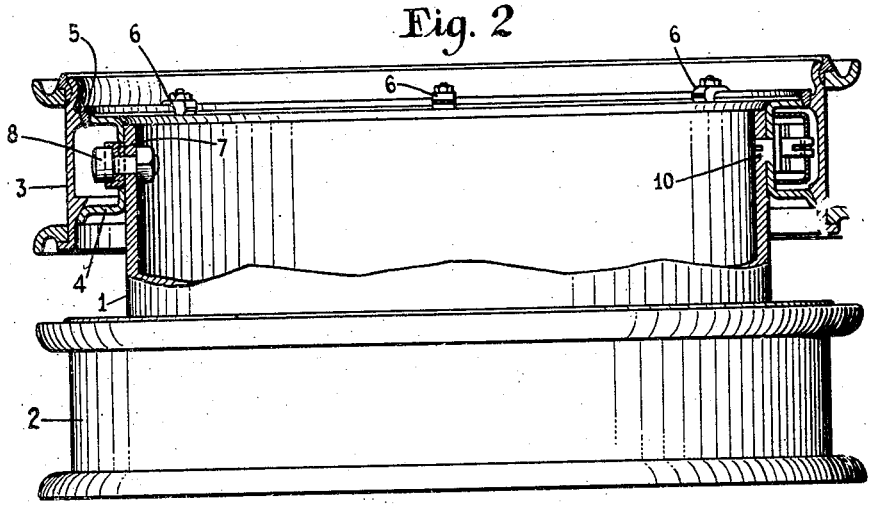
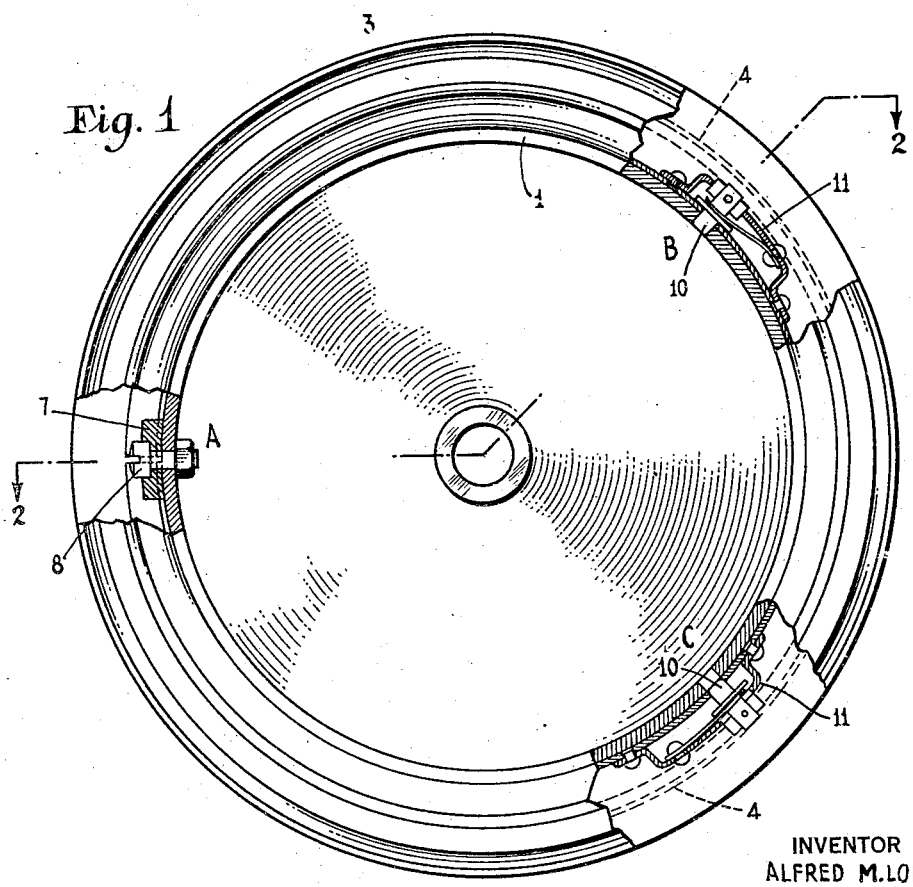
INVENTOR
ALFRED M. LOFLAND
BY
Bohleber & Ledbetter
ATTORNEY Aug. 18, 1931.  A. M. LOFLAND  1,819,297
DEMOUNTABLE FELLY
Filed May 1, 1926    2 Sheets-Sheet 2
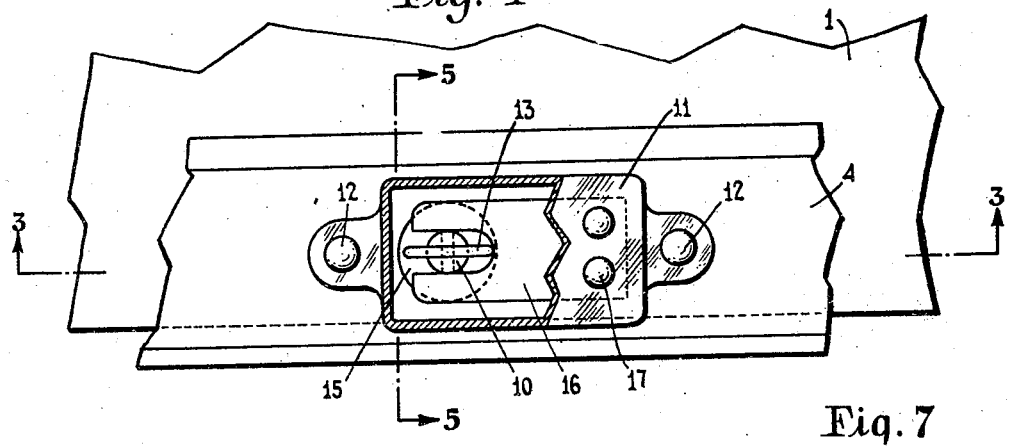
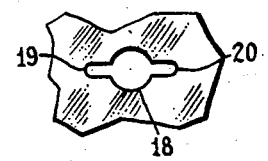
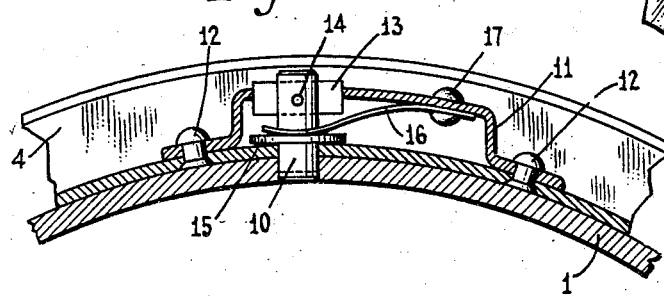
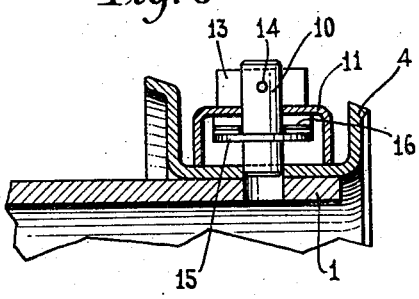
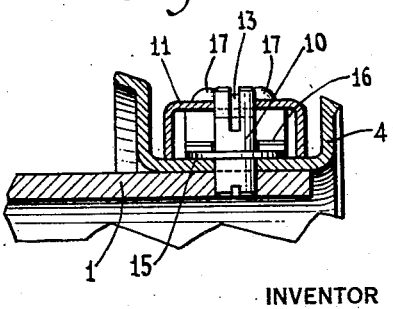
INVENTOR
ALFRED M. LOFLAND
BY
Bohleber & Ledbetter
ATTORNEY Patented Aug. 18, 1931

1,819,297

UNITED STATES PATENT OFFICE

ALFRED M. LOFLAND, OF LEBANON, INDIANA

DEMOUNTABLE FELLY

Application filed May 1, 1926. Serial No. 105,912.

This invention relates to dual pneumatic wheels and more particularly to an improvement upon apparatus shown and described in my Patent No. 1,715,610, dated June 4, 1929, filed concurrently herewith entitled Dual pneumatic wheels. In the patent referred to I have shown a wheel adapted to carry a pair of standard rims and comprising a master felly permanently associated with the wheel, and a demountable split felly for the outer rim adapted to be mounted on the master felly adapted to carry a standard rim. This demountable felly is so constructed and arranged and its mounting means is so constructed and arranged that it may be secured in position by only three bolts, and will absorb and prevent any lost motion between the master felly and a standard rim mounted upon and carried by the split felly which might take place due to variations in the size of the master felly or the rim. As shown in that patent the demountable split felly is bolted to the master felly at two points B and C approximately 90° apart and each substantially 135° from the ends of the felly. Registering slots are provided in the ends of the felly adapted to cooperate with a lug or block mounted on the master felly to prevent lateral motion of the ends of the split felly. Under the operations of mounting a standard rim upon this split felly the free ends of the felly creep toward each other and tightly grip the master felly, absorbing and preventing all lost motion. In this patent I have shown and described an improvement upon the apparatus disclosed in the patent above referred to, eliminating the bolts at points B and C by the substitution of retractile pins therefor.

It is an object of this invention to provide a felly of the class described which may be mounted upon a master felly by the use of not more than a single bolt.

It is a further object of this invention to provide a felly which may be mounted upon a master felly in a minimum of time and which shall be positive, reliable, and safe.

It is a further object of this invention to provide a felly of the class described with means for positively preventing the assembly of a rim thereon when the felly is not positively secured in position.

Still other objects of my invention will be apparent from the specification.

The particular features of novelty which I believe to be characteristic of my invention are pointed out in the appended claims. The invention itself, however, both as to its underlying principles and as to its particular embodiment will best be understood by reference to the specification and accompanying drawings in which Figure 1 is a side elevation of a wheel partly broken away showing the felly securing means, one of the pins being extended and the other retracted; and the home position of the inside of the rim being shown in dotted lines;

Figure 2 is a plan elevation of the same partly in section on lines 2—2 of Figure 1 and partly broken away;

Figure 3 is a longitudinal sectional view along lines 3—3 of Figure 4 showing details of the pin and pin housing;

Figure 4 is a fragmentary top plan view of a felly member showing one of the pin housings partially broken away;

Figure 5 is a sectional view along lines 5—5 of Figure 4 showing the pin in extended position;

Figure 6 is a section along lines 5—5 of Figure 4 showing the pin in retracted position; and Figure 7 is a detail of the housing showing the key slot therein.

Referring now to Figure 1 I have shown diagrammatically, a wheel provided with a master felly band 1 adapted to carry a pair of standard rims 2 and 3, 2 being the inner rim and 3 the outer rim. Inasmuch as the method of mounting this inner rim forms no part of the invention herein described it is not referred to in detail. It is sufficient to state that rim 2 may be mounted upon and carried by master felly band 1 in any suitable way for instance as shown in the patent referred to above. Outer rim 3 is carried demountably upon felly 4 and is secured in position thereon by means of standard wedge ring 5 and clamps 6 held in position by suitable bolts and nuts. It is to be pointed out at this time that rims 2 and 3 are standard rims, such as Firestone rims, provided with wedge surfaces on the interior adapted to seat upon a standard felly such as a standard Firestone steel felly. The wedge ring 5 and clamps 6 also standard in the art with the rims and fellies described and are therefore not described in detail.

In the patent referred to above I have described the standard felly as modified according to my invention by being split and having registering slots in the ends, adapted to engage with a lug or block demountably secured upon the master felly band. In the present instance felly member 4 is likewise a standard felly such for example as standard Firestone steel felly split at some point in its circumference and provided with registering slots in its ends adapted to engage with lug or block 7 demountably secured upon master felly band 1 by means of bolt 8 passing through said block and said master felly band as described in the patent referred to. In that patent I have described the method of bolting split felly to the master felly band at points such as B and C, each substantially 135° from the ends at A.

In accordance with this invention, however, I dispense with the bolts at points B and C and provide upon the felly member 4 a pair of retractile pins 10 each contained within a housing 11 secured upon the outer side of the felly 4 and adapted in one position to project through the felly 4 and through master felly band 1 to anchor the felly band against movement, and adapted to be withdrawn to another position and retained therein to permit demounting of felly 4 from master felly band 1. It is to be understood that pins 10 take the place of the bolts shown and described in the above identified patent at points B and C providing for rapid mounting and demounting of felly member 4, but do not affect the method of mounting the felly at point A to secure the ends against relative lateral motion.

Referring now more particularly to Figures 3, 4, 5, and 6, each of the pins 10 is slotted to permit the mounting of projecting key member 13, fixed in position by pin 14 driven through the pin 10 and through key member 13. A hole is provided in felly 4 adapted to register with a hole provided in master felly band 1 whereby the pins 10 may project through felly 4 and master felly band 1 to anchor the felly. A suitable disc 15 is mounted upon pin 10 in any suitable manner, such for example as by a driving fit, and is engaged by a suitable spring 16 secured to housing 11 as for example by rivets 17. Housing 11 is secured in position upon felly 4 by suitable means such for example as rivets 12 and the top of such housing is provided with a hole 18 of sufficient size to permit pin 10 to move therein and also with key slots 19 and 20 as shown in Figure 7 to permit key 13 to pass into said housing when pin 10 is in the proper angular position.

Referring now to Figure 3 in which the pin 10 is shown in its extended position, passing through felly 4 and master felly band 1, it will be seen that the pin may be depressed by pushing against its inner surface with any suitable tool, such as a screw driver, until the pin clears the master felly band 1 as shown in Figure 6. The depth of key 13 and housing 11 are so chosen that when pin 10 has been retracted to this point the key 13 will be free of the key slots 19 and 20 in housing 11 and the pin may be rotated. Suitable means for permitting rotation for the pin are for example a slot cut in the inner head of the pin whereby a screw driver may be inserted in the slot to depress and rotate the pin. Upon rotation of the pin the key member will pass out of registry with the key slots 19 and 20 in housing 11 which will prevent the return of the pin 10 to its projected or home position by spring member 16. When both the pins have been so secured in their retracted position bolt 8 and lug 7 may be removed and the felly may then be drawn off.

It is to be here noted that pins 10 are of such length that rim 3 cannot be mounted upon the felly 4 when the pins are in retracted position, since these pins project out beyond the diameter of rim 3 at the corresponding point and therefore interfere with the seating of rim 3, thereby preventing mounting the rim upon the felly when the felly itself has not been properly secured in position. It is also to be noted that after the pins have been extended to their home position, thereby safely fastening felly 4 to master felly band 1 and rim 3 has been mounted, the pins cannot be retracted to a distance sufficient to allow felly 4 to work loose, because of the lack of sufficient clearance under rim 3.

In order to mount felly 4 according to my invention upon master felly band 1 the pins 10 will be each pushed in as far as possible and rotated through 90° thereby securing them in retracted position. Felly 4 may then be mounted upon master felly band 1 so that pins 10 register with the holes provided therefor in master felly band 1. The pins may then be seated in their home position by rotation until key 13 enters key slots 19 and 20 whereupon spring 16 will force the pins home. Block 7 may then be secured in the registering slots in the ends of the felly by means of bolt 8. Felly 4 is not secured upon master felly band 1 at points B and C against rotation or lateral motion and at point A against transverse relative motion but is free at point A to expand or contract. In mounting rim 3 upon the felly 4, the coaction of wedge ring 5, and the wedge surfaces on the inner side of rim 3 when the clamping bolts are tightened on clamps 6 causes the felly 4 to contract whereby the ends creep toward each other at A until all lost motion is absorbed and prevented, as described in the patent previously referred to.

In order to remove felly 4, it is only necessary to loosen the clamping bolts and remove clamps 6, then remove bolt 8 and block 7, and finally retract the pins by depressing them and rotating the necessary amount to secure them in position. The felly can then be withdrawn.

While I have shown and described one form of my invention, it will be understood that I am not limited thereto, but that modifications and changes may be made without departing from the scope and spirit of my invention.

Having described my invention in such manner that those skilled in the art may practice it and obtain the benefits thereof I declare that what I claim is:

1. A demountable rim wheel comprising a master felly member, and a split felly member carried thereon, pin means carried on the outer face of the split felly member, and a portion of said pin extending beyond the outer circumference of the split felly when in retracted position which provides an obstruction to the mounting of a rim thereon.

2. A demountable rim wheel comprising a master felly member, and a split felly member carried thereon, pin means carried on the outer face of the split felly member, retractible means to hold the pins in engaged position and a portion of one of said means extending beyond the outer circumference of the split felly when in retracted position which provides an obstruction to the mounting of rim thereon.

In testimony whereof, I have hereunto set my hand this 28th day of April, 1926.

A. M. LOFLAND.